Patented Aug. 22, 1944

UNITED STATES PATENT OFFICE 2,356,265

2,356,265

4-MERCAPTOBENZENESULPHONAMIDE

Elmore H. Northey, Bound Brook, N. J., assignor to American Cyanamid Company, New York, N. Y., a corporation of Maine No Drawing. Application August 5, 1942, Serial No. 453,723

5 Claims. (Cl. 260—556)

This invention relates to a new class of chemical compounds, namely the mercaptobenzene sulphonamides and salts thereof.

The compounds with which the present invention is concerned may be represented generally by the following type formula

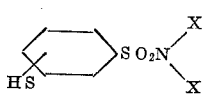

in which X may represent either hydrogen or an alkali metal radical. These compounds are useful as intermediates in the preparation of other compounds and as oxidation retarders in the manufacture of soaps and the like.

While the present invention is not limited to any particular process of preparing the compounds, I have found that good yields of high quality may be obtained by reacting a diazotized sulphanilamide salt with an alkali xanthate at a relatively high pH. When this reaction is complete the product may be precipitated in the form of a salt by reducing the pH of the reacted mixture and collecting the precipitate by filtration. The free base may be isolated and purified by acidification and recrystallization.

The following examples specifically illustrate the preferred method of preparing these new compounds. These examples, however, are merely illustrative and not by way of limitation. All parts are by weight.

EXAMPLE 1

*Sodium salt of 4-mercaptobenzenesulphonamide*

173 parts of sulphanilamide was dissolved in 700 parts of hot water to which 243 parts of hydrochloric acid (38%) had been added. The solution was cooled to below 10° C. and diazotized with an equivalent amount of sodium nitrite dissolved in a sufficient amount of water. Concurrently, an alkali xanthate solution was prepared by stirring 106 parts of carbon disulphide into a solution containing 100 parts of ethyl alcohol, 77 parts of potassium hydroxide and 90 parts of water while maintaining the temperature at from 20–35° C. The red solution so produced was added to a solution of 125 parts of sodium carbonate in 900 parts of water. The xanthate solution was then heated to about 70° C. and the diazotized solution slowly stirred into it over a period of about one hour, care being taken to keep the temperature below 75° C. During this period a considerable evolution of gas occurred. The reacted mixture was cooled to room temperature. The solids therein were collected by filtration and hydrolyzed by dissolving them in 1060 parts of a 5.7% solution of sodium hydroxide and boiling the solution for about 1½ hours while bubbling nitrogen therethrough. The solution was then cooled to room temperature and sufficient hydrochloric acid added thereto to reduce the pH to about 9.0. 120 parts of sodium chloride was added thereto. The precipitated solid, the sodium salt of 4-mercaptobenzene sulphonamide, was filtered off and washed with brine.

EXAMPLE 2

*4-mercaptobenzenesulphonamide*

The product of Example 1 was suspended in warm water and a sufficient quantity of hydrochloric acid added thereto to reduce the pH to about 4.0. A gray precipitate formed which was filtered off, washed thoroughly and dried in a vacuum desiccator over potassium hydroxide. The cream colored product, crude 4-mercaptobenzenesulphonamide, was purified by crystallization from benzene and water. The purified product melted at from 139.5–140.5° C.

Homologs and analogs of the 4-mercaptobenzene may be prepared by starting from the corresponding homologs or analogs of sulphanilamide. The various starting compounds may have substituted constituents in the benzene ring. These, however, should be either non-diazotizable or the group should be blocked before carrying out the diazotization step. Different metal salts may be prepared by substituting the proper alkali in the hydrolyzation step.

I claim:

1. A mercaptobenzenesulphonamide represented by the following type formula

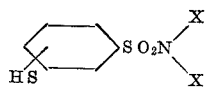

in which X represent members selected from the group consisting of hydrogen and the alkali metals.

2. 4-mercaptobenzenesulphonamide.

3. An alkali metal salt of 4-mercaptobenzenesulphonamide.

4. A method of preparing an alkali metal salt of a mercaptobenzenesulphonamide which comprises reacting a diazotized sulphanilamide salt with an alkali xanthate in a strongly alkaline solution, collecting the resultant precipitate and hydrolyzing it in a strong solution of the alkali metal hydroxide.

5. A method of preparing a mercaptobenzenesulphonamide which comprises reacting a diazotized sulphanilamide salt with an alkali xanthate in a strongly alkaline solution, collecting the resultant precipitate, hydrolyzing it in a strong solution of the alkali metal hydroxide, collecting the alkali metal salt, suspending it in warm water and adding a sufficient amount of an acid to reduce the pH to a point at which the free base is precipitated.

ELMORE H. NORTHEY.